(12) United States Patent
Stravitz

(10) Patent No.: US 8,684,218 B1
(45) Date of Patent: Apr. 1, 2014

(54) MULTI-COMPARTMENT, SUCTION-CAPABLE VESSEL

(71) Applicant: David M Stravitz, New York, NY (US)

(72) Inventor: David M Stravitz, New York, NY (US)

( * ) Notice: Subject to any disclaimer, the term of this patent is extended or adjusted under 35 U.S.C. 154(b) by 0 days.

(21) Appl. No.: 13/972,118

(22) Filed: Aug. 21, 2013

(51) Int. Cl.
| | |
|---|---|
| *B65D 6/28* | (2006.01) |
| *B65D 6/24* | (2006.01) |
| *B65D 8/18* | (2006.01) |
| *B65D 8/14* | (2006.01) |
| *B65D 1/24* | (2006.01) |
| *B65D 21/032* | (2006.01) |
| *F16B 47/00* | (2006.01) |

(52) U.S. Cl.
USPC ........ 220/504; 220/4.03; 220/4.26; 220/4.21; 220/4.27; 220/798; 220/23.89; 220/23.87; 206/504; 206/509; 248/205.7; 248/206.2; 248/362

(58) Field of Classification Search
USPC ........ 220/504, 4.03, 4.26, 4.21, 23.87, 23.89, 220/23.86, 4.27, 796, 797, 798; 206/501, 206/509; 248/205.7, 206.2, 683, 362
See application file for complete search history.

(56) References Cited

U.S. PATENT DOCUMENTS

| | | | |
|---|---|---|---|
| 2,910,264 | A | 10/1956 | Lindenberger |
| 4,505,446 | A | 3/1985 | Roder |
| 5,000,123 | A | 3/1991 | Morse et al. |
| D357,170 | S | 4/1995 | Wellsfry |
| 5,743,210 | A | 4/1998 | Lampe |
| 6,105,812 | A * | 8/2000 | Riordan ................... 220/504 |
| 6,581,541 | B2 | 6/2003 | Hollinger |
| D595,565 | S | 7/2009 | Robertson et al. |
| 8,186,642 | B2 | 5/2012 | Weiss-Vons |
| 8,231,089 | B2 | 7/2012 | Mills |
| 2006/0151511 | A1 | 7/2006 | Kaposi |

FOREIGN PATENT DOCUMENTS

CA  627901 A  9/1961

* cited by examiner

*Primary Examiner* — Fenn Mathew
*Assistant Examiner* — Jennifer Castriotta
(74) *Attorney, Agent, or Firm* — Brian Roffe

(57) ABSTRACT

Vessel including a unitary or two-part vessel base having an intermediate wall portion, upper and lower wall portions on opposite sides of the intermediate wall portion, and upper and lower seal rims adjacent the respective upper and lower wall portions. The upper and intermediate wall portions define an upper chamber space including at least one upper chamber. The lower and intermediate wall portions define a lower chamber space including at least one lower chamber. The seal rims include edges configured to provide suction when pressed against a flat surface, preferably when these rims are wet. Lids engage with upper and lower lid-receiving portions, respectively, defined by the vessel base to selectively close the upper or lower chamber space. The two-part vessel base has a mating structure to facilitate selective attachment and separation.

20 Claims, 15 Drawing Sheets

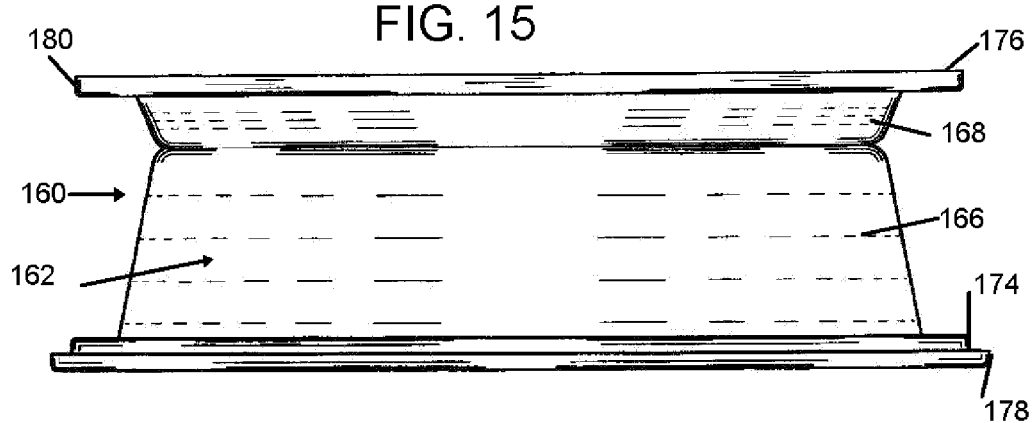
FIG. 15
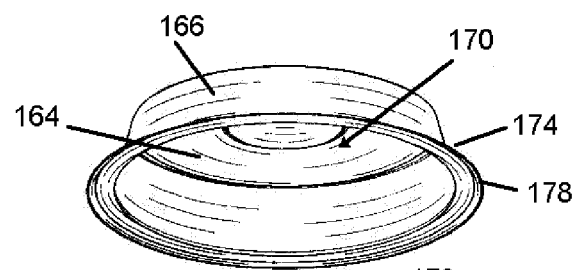
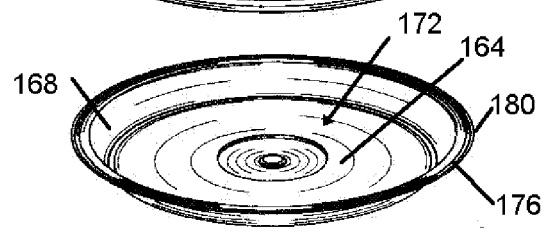
FIG. 17
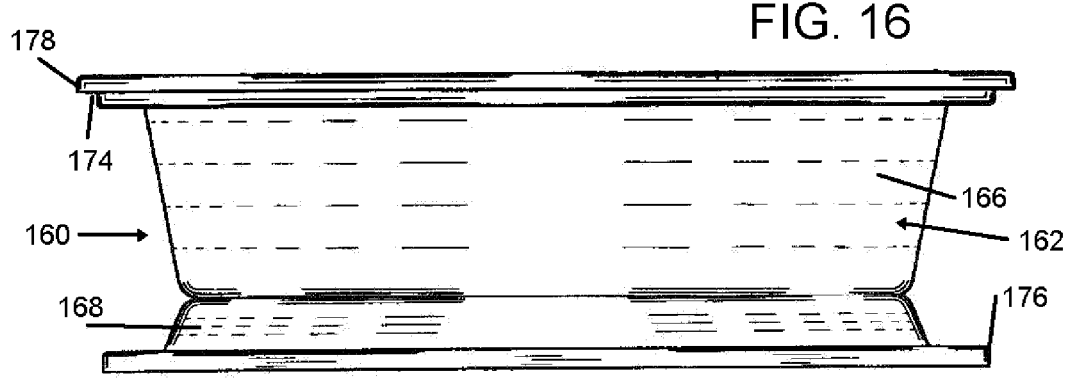
FIG. 16

MULTI-COMPARTMENT, SUCTION-CAPABLE VESSEL

FIELD OF THE INVENTION

The present invention relates generally to vessels for use in storage, packaging and serving and more particularly, to a vessel that has multiple compartments for storing potentially different objects and is also capable of being attached and/or used in two different orientations by suction.

The present invention is also directed generally to methods for storing objects, including but not limited to food, using a multi-compartment vessel or container so that potentially different items can be stored in the same vessel.

BACKGROUND OF THE INVENTION

Storage vessels or containers are well-known and used in everyday living. Some, such as those used for feeding infants and toddlers, are in addition to being provided with a closure mechanism such as a lid, also provided with a suction capability to enable them to be attached to trays and tables in an effort to reduce spillage of the contents therefrom.

For example, U.S. Pat. No. 5,000,123 (Morse et al.) describes an anti-tipping feed dish formed with a truncated conical exterior wall coaxially defining a feed bowl cavity arranged interiorly of the dish, and that defines a feed bowl floor. A bowl floor is spaced from the feed bowl floor and defines a lower cavity coaxially arranged with the feed bowl cavity which in turn defines an enclosed cavity capturing a predetermined quantity of weighted materials. The bowl floor may have mounted thereto, suction cups to enhance securement of the bowl to a support surface.

U.S. Pat. No. 8,231,089 (Mills) describes a plate holder comprising a skirt having a top member and one or more side walls forming a cavity therebetween when the one or more side walls are resting on a substrate with the top member oriented away from the substrate, and a base coupled with the skirt and located within the cavity. The base has one or more top suction device receptacles and one or more bottom suction device receptacles. A respective top suction device is coupled with each top suction device receptacle such that the top suction device is oriented away from the substrate. Similarly, a respective bottom suction device is coupled with each bottom suction device receptacle such that the bottom suction device is oriented toward the substrate.

OBJECTS AND SUMMARY OF THE INVENTION

It is an object of an embodiment of the present invention to provide vessels for use in storage, packaging and serving.

It is another object of an embodiment of the present invention to provide a vessel that has multiple compartments for storing different objects and is also capable of being attached in two different orientations by suction.

It is yet another object of an embodiment of the present invention to provide a method for storing objects, including but not limited to food, using a multi-compartment container so that potentially different items can be stored in the same vessel.

A vessel in accordance with the invention includes a vessel base comprising an intermediate wall portion, an upper and a lower side wall portion on opposite sides of the intermediate wall portion, and an upper and lower rim adjacent the lower and upper side wall portions, respectively. The side wall portions and intermediate wall portion define upper and lower chamber spaces each including at least one chamber. The upper and lower rims are configured to provide suction when pressed against a flat surface. Lids engage with upper and lower lid-receiving portions defined by the vessel base to selectively close the chamber spaces. To aid in closure, a lid-engaging structure for removably trapping the lids onto the base is provided, e.g., circumferential beads, and a lid-supporting structure for supporting the lids in engagement with the base, e.g., one or more ribs, is also provided.

In one embodiment, the base has a unitary structure. In another, it is formed from two parts.

In either case, a container support structure may be provided to support at least one interior container in each chamber space. The container support structure may include a rim formed on the intermediate wall and extending into each chamber space. In this case, interior containers are provided, each including a lower rim configured to abut against an inner surface of a rim formed on the intermediate wall. Each container may include an annular wall and the lids each may— include a rim on an underside that engages with the interior container to thereby secure the interior containers in connection with the base.

As to the stackability feature, the upper rim is configured to have a complementary structure to the lower rim to enable stackability of the vessel via engagement of a lower rim of one vessel to an upper rim of another vessel. This may be achieved by providing a U-shaped channel on one rim and the other rim with a complementary U-shaped cross-section.

Another embodiment of a vessel includes two lids and a vessel base including compartment forming structure for forming two independent, unconnected compartments opening on upper and lower sides of the base, a suction-providing structure arranged at upper and lower edges of the compartment forming structure to enable the base to be suction-attached to a surface, a cooperating mating structure arranged at the upper and lower edges of the compartment forming structure to enable the vessel to be stacked onto another vessel, and a lid-engaging structure for releasably securing the lids in connection with the base. Also, an interior compartment defining structure may be arranged on the compartment forming structure and/or the lids for partitioning a compartment into a plurality of independent sub-compartments.

The lid with the annular ring seals in the interior compartment and prevents the migration of the contents, liquid or solid, from migrating over to the other compartments in the vessel. It thus functions like a lid within a lid. This is advantageous when stacking, turning over or traveling, etc.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 15 is a side view of another embodiment of a vessel in accordance with the invention in one orientation;

FIG. 16 is a side view of the embodiment shown in FIG. 15 in an inverted configuration; and FIG. 17 shows the attachment of the upper and lower portions of the vessel shown in FIGS. 15 and 16.

DETAILED DESCRIPTION OF THE INVENTION

Figure 1:
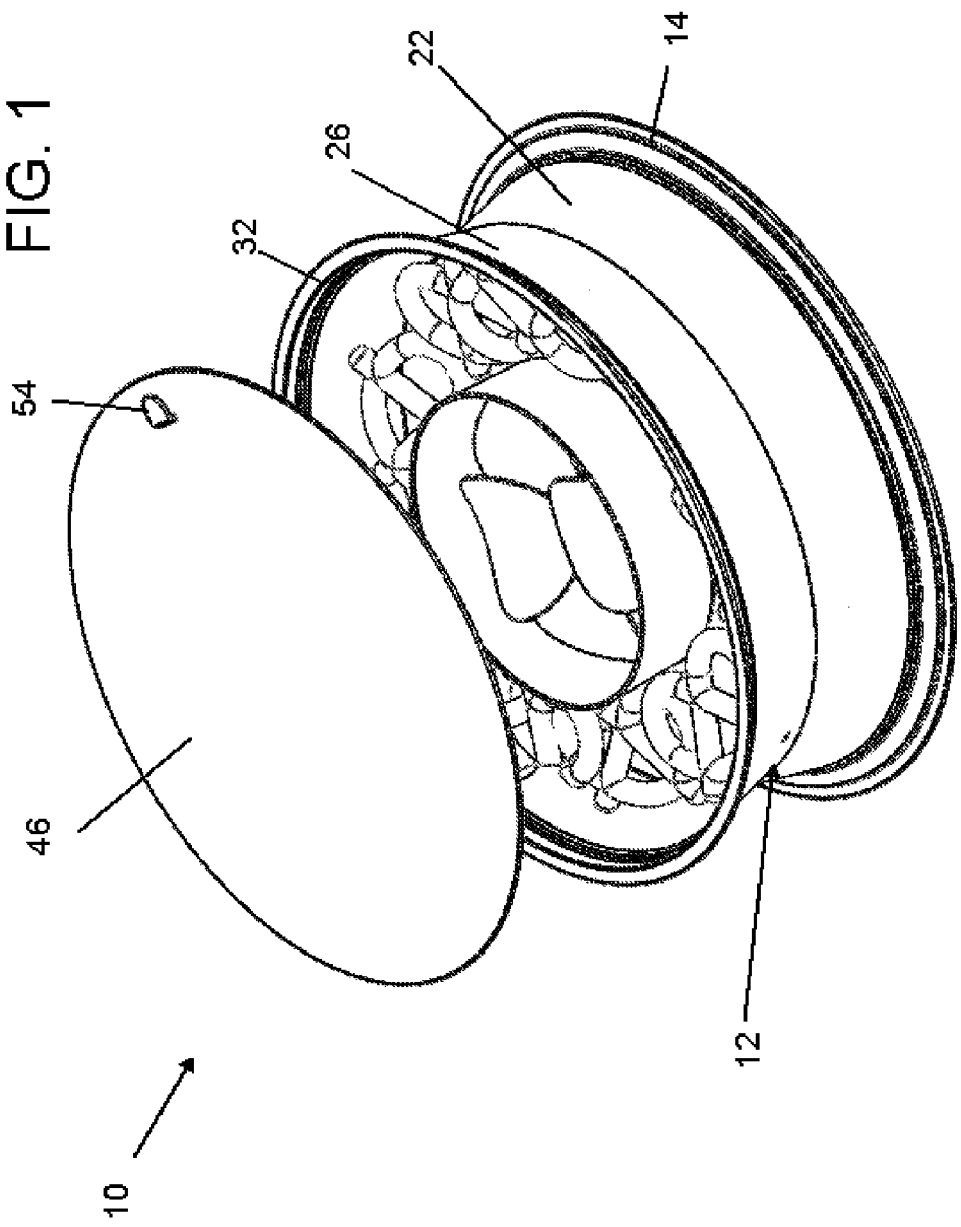
FIG. 1 is a perspective view of a first embodiment of a vessel in accordance with the invention shown with its lid in an open state and items stored therein being visible.

Referring to the accompanying drawings wherein like reference numerals refer to the same or similar elements, a first embodiment of a multi-compartment vessel in accordance with the invention is designated generally as 10 and is shown in FIGS. 1-7. Vessel 10, which may also be referred to as a utensil, container, housing, package or bowl, includes a vessel base 12 that defines at least one chamber on each side, i.e., when the vessel 10 is placed onto a horizontal surface, there is at least one chamber that opens upward in a direction away from the horizontal surface and at least one other chamber that opens in a direction downward toward the horizontal surface. The upwardly opening chamber may, when accessible, be used to serve food if stored in this chamber or access objects such as hardware when stored in this chamber. The downwardly opening chamber would be sealed by a sealing mechanism and prevent any food or objects therein from spilling out onto the horizontal surface. By inverting the vessel, the downwardly opening chamber would be accessible by removing the sealing mechanism and the upwardly opening chamber would be sealed by engaging its sealing mechanism before inversion. Thus, both chambers may alternatively be used with one being open for accessing the contents thereof while the other is sealed. Both chambers are suctionable with and without sealed content in one or both chambers.

Figure 2:
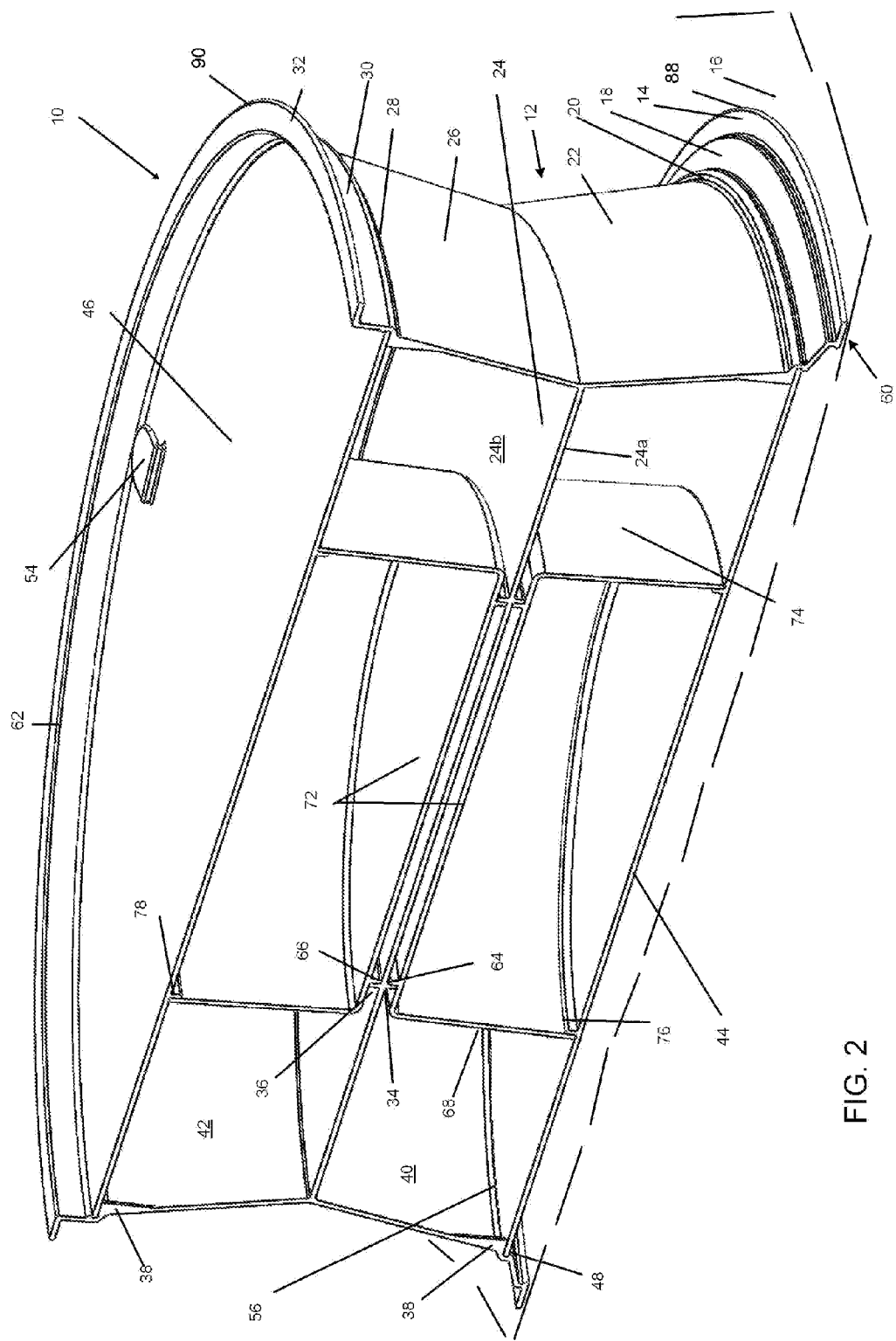
FIG. 2 is a cross-sectional view of the vessel shown in FIG. 1 with the lid engaged during a storage or transport state and without items stored therein.
Figure 3:
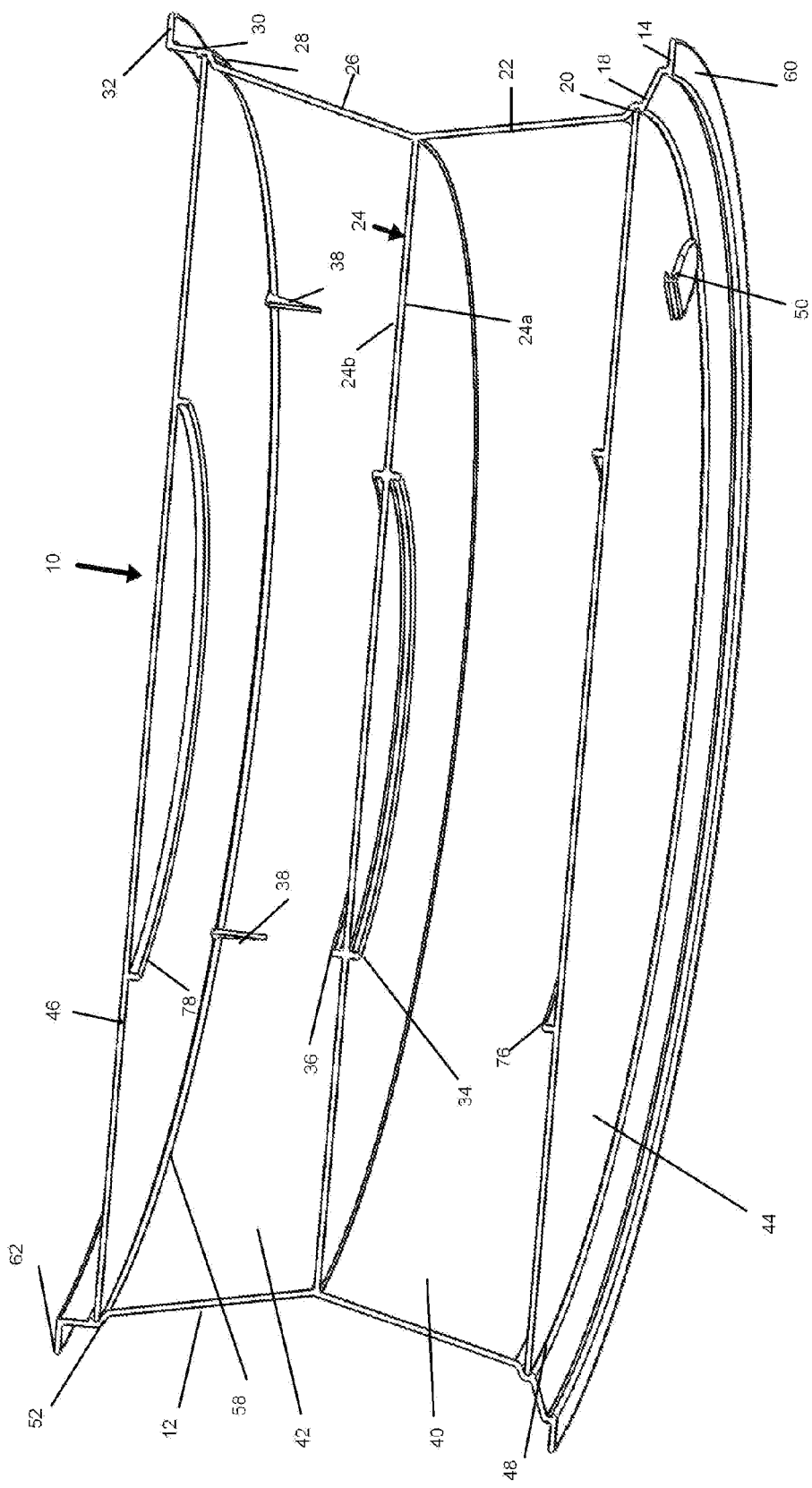
FIG. 3 is a cross-sectional view of the vessel shown in FIG. 1 with the lid engaged during a storage or transport state and without items stored therein, and with interior removable vessels removed.

In the embodiment shown in FIGS. 1-4, vessel base 12 is a unitary structure, so that this embodiment of the vessel 10 is referred to as the unibody. Vessel base 12 has a single body which is shaped in cross-section as shown in FIGS. 2 and 3, i.e., with a lower rim 14 at the bottom (when positioned as shown in FIG. 1 on a horizontal surface 16 represented by the dotted lines in FIG. 2), an upward portion 18 above the lower rim 14 as shown in FIGS. 2 and 3, a side wall defined by an inwardly tapering support portion 20 above the upward portion 18, and another inwardly tapering portion 22 that extends to a substantially circular intermediate wall 24. On the other side of the intermediate wall 24, the base 12 includes substantially the same structure, i.e., a side wall defined by an outwardly tapering portion 26 that extends upward from the intermediate wall 24, an outwardly tapering support portion 28 above the tapering portion 26, an upward portion 30 above the tapering support portion 28 and an upper rim 32.

As shown most clearly in FIG. 3, annular rims 34, 36 are formed on the opposite sides of the intermediate wall 24 and project into the respective chambers on both sides of the intermediate wall 24. Annular rims 34, 36 can be any shape as desired, and can be eliminated should the need for interior containers that are designed to engage with the annular rims 34, 36, not be needed.

An important difference between the structure on opposite sides of the intermediate wall 24 is the form of the upper rim 32 that differs from the form of the lower rim 14 to enable mating of this structure (discussed below with reference to FIGS. 6 and 7). Generally then, the base 12 includes a cooperating mating structure on opposite rims, with one form of the mating structure being integrated in, incorporated into or arranged on the lower rim 14 and the other form of the mating structure being integrated in, incorporated into or arranged on the upper rim 32. This structure may be referred to as cooperating mating means herein.

The combination of the intermediate wall 24 and the inwardly tapering portion 22 define a lower chamber space 40, i.e., defined primarily by a lower surface 24a of the intermediate wall 24 and an inner surface of the inwardly tapering portion 22, while the combination of the intermediate wall 24 and the outwardly tapering portion 26 define an upper chamber space 42, i.e., defined primarily by an upper surface 24b of the intermediate wall 24 and an inner surface of the outwardly tapering portion 26 (see FIG. 3). Thus, the intermediate wall 24 defines both lower and upper chamber spaces 40, 42, i.e., the upper surface 24b of the intermediate wall 24 is the bottom of the upper chamber space 42 in the orientation of the vessel 10 as shown in FIGS. 2 and 3 and the lower surface 24a of the intermediate wall 24 is the bottom of the lower chamber space 40 when the vessel is inverted from the position shown in FIGS. 2 and 3. Generally then, the base includes compartment forming structure or means that defines two independent, unconnected compartments on opposite sides of a common wall or wall structure.

The outer surfaces of the inwardly and outwardly tapering portions 22, 26 may be dimensioned as desired to provide various configurations of the vessel 10 and in particular, either the same or different sizes of the lower and upper chamber spaces 40, 42.

Figure 4:
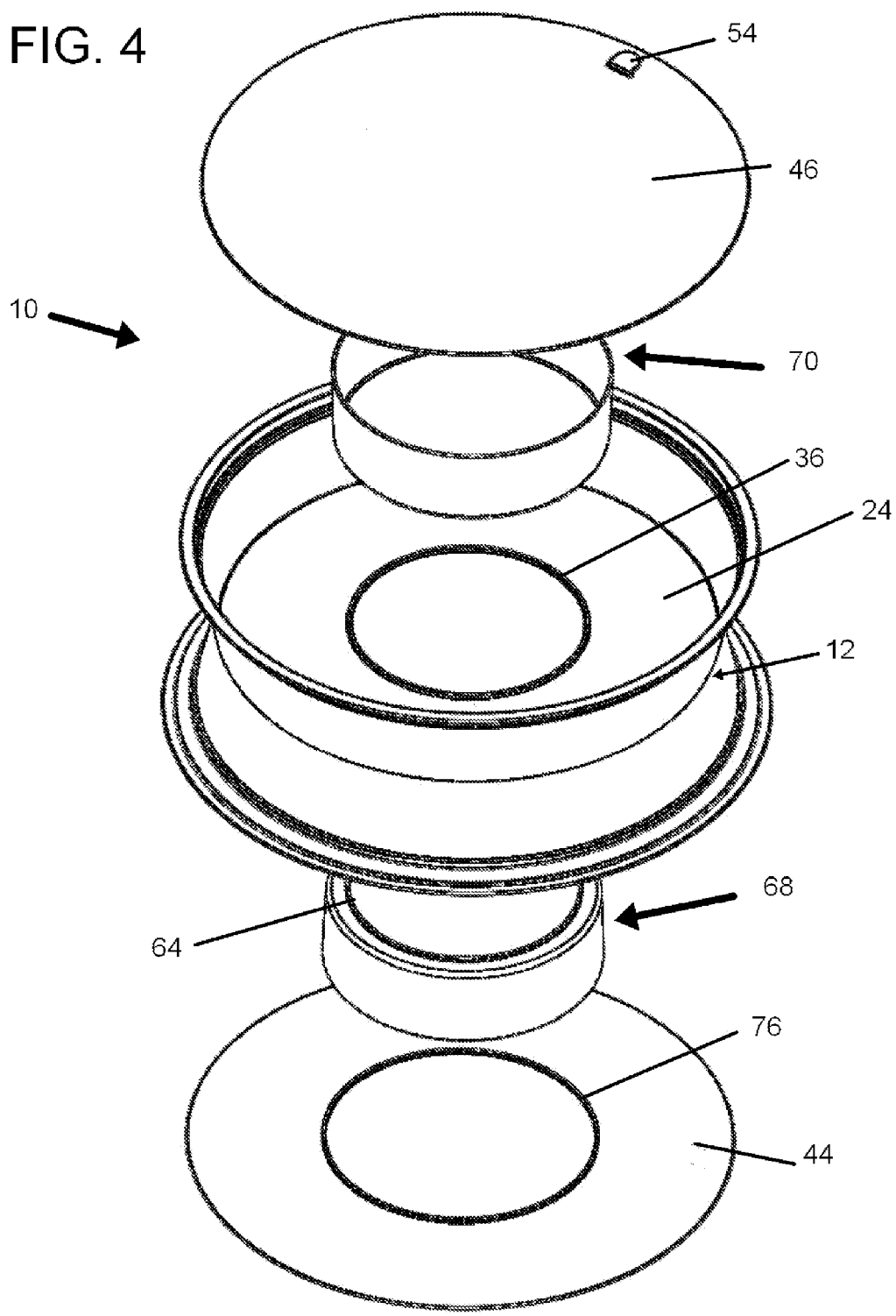
FIG. 4 is an exploded view of the vessel shown in FIG. 1 without items stored therein.

Regarding its shape, vessel 10 may have any desired shape and is not limited by the circular shape shown (see, e.g., FIG. 4). Thus, the vessel base 12 may be constructed with a circumference that is round, square, rectangular, oval circumference, etc., although a preferred shape is circular or round because a suction providing effect of the rims 14, 32 discussed below is best for such a shape.

The illustrated embodiment in FIG. 3 shows the lower and upper chamber spaces 40, 42 having substantially the same size. However, an alternative formation of the body 12 is possible in which a small lower chamber space and a larger upper chamber space are provided (and vice versa). This may be achieved by adjusting the height of the side walls defined by the tapering portions 22, 26. In general, the depiction of the base 12 in the illustrations is not intended to limit the invention and other relative dimensions of the upper and lower chamber spaces 40, 42 are considered part of the invention.

Further, the inwardly and outwardly tapering portions 22, 26 may be substituted for by annular wall portions that have a substantially uniform cross-section, i.e., cylindrical wall portions, or other shapes of tubular wall portions. In its most basic form, the base 12 has a first side wall defining the lower chamber space 40 and a second side wall defining the upper chamber space 42. Also, tapering portions 22, 26 may be constructed without a taper. Thus, the side walls of the chamber spaces 40, 42 may be for example, cylindrical or have the shape of a truncated cone. Although taper may be the preferred embodiment insofar as it assists the spread and prevents inner collapse when performing suction. Another consideration is moldability from injection molding. Taper is critical for releasing the part out of the cavity and core. So even if the shape is substantially cylindrical, a certain amount (½ or 1 degree per side) is necessary. Therefore any taper assists in reducing collapse and thus allow for suction to perform.

To complete the vessel 10, lids 44, 46 removably engage with the base 12 (see FIG. 4). Referring to FIGS. 2 and 3, in particular, lid 44 engages with the support portion 20. To this end, a bead 48 is formed on the support portion 20, on the upward portion 18 adjacent to the support portion 20 and/or at a juncture between the upward portion 18 and the support portion 20. Bead 48 enables the lid 44 to snap onto the base 12, yet also enables its removal from engagement with the base 12 by pulling on a tab 50 formed on the lid 44. Similarly, a bead 52 is formed on the support portion 28, on the upward portion 30 adjacent to the support portion 28 and/or at a juncture between the support portion 28 and the upward portion 30. Bead 52 enables the lid 46 to snap onto the base 12, yet enables its removal from engagement with the base 12 by pulling on a tab 54 formed on the lid 46. Beads 48, 52 may each be a 360° bead that extends entirely around the periphery of the base 12 to trap and seal the respective lid 44, 46 in connection with the base 12. However, beads 48, 52 are not required to extend completely around the periphery of the base 12 if a lower extent of coverage suffices to trap the lids 44, 46 against ribs 38 (discussed below).

Referring to FIGS. 2-5, in a more general manner, the base 12 includes two lid-engaging portions or lid-engaging means that cooperate with lids 44, 46 to enable each lid to be individually engaged with the base 12 to seal a respective one of the chamber spaces 40, 42, while also allowing the lids 44, 46 to be removed from engagement with the base 12 to enable access to the chamber spaces 40, 42. Other structure known to those skilled in the art that performs these functions is also envisioned and within the scope of the invention.

To aid in support of the lids 44, 46, the base 12 includes a lid supporting structure or means formed on the inner surface of the tapering portions 22, 26. In one embodiment, the lid supporting structure comprises a plurality of individual support ribs 38 spaced around the circumference of the inner surface of each of the inwardly tapering portions 22, 26 (see FIG. 3). Each rib 38 projects inward toward a center of the base 12. The inward projecting extension of each rib 38 should be limited to avoid excessively reducing the available storage space. In one embodiment however, the chamber space 40, 42 may be partitioned into several wedge-shaped chambers, with the ribs serving as partitions and thus have a dual function of both partitioning the chamber space into chambers and supporting the lid.

Ribs 38 ideally are molded with the base 12, and thus integrated with the base 12 at the time of manufacture of the vessel 10. Ideally, ribs 38 are formed at a distance from the bead 48, 52 that is substantially the same as the thickness of the lids 44, 46 used with the base 12. The particular configuration and placement of the ribs 38 depends, for example, on the size, shape, volume and diameter of the chamber spaces 40, 42. Also, if desired, ribs 38 may extend alongside the entire side wall portions 22, 26 to the intermediate wall 24.

In another embodiment, instead or in addition to ribs 38, a shelf or ridge 56, 58 that extends around the periphery of the base 12 is provided on the support portions 20, 28, respectively. Each shelf 56, 58, as well the ribs 38, prevents the supported lid 44, 46 from being pressed inward and collapsing inward and onto the contents of the chamber space 40, 42 when present (see FIGS. 2 and 3).

Tabs 50, 54 facilitate lifting of the lids 44, 46, respectively, out of engagement with the base 12, Instead of tabs 50, 54, any type of a lifting structure or lifting means, such as a pull tab may be provided. Tabs 50, 54 may each be a small tab extending outwardly from an area proximate yet spaced apart from an outer edge of the respective lid 44, 46. By pulling each tab 50, 54 upward, the respective lid 44, 46 can be easily removed from engagement with the lid-receiving portion of the base 12. Alternatives to the tabs 50, 54 are known to those skilled in the art and encompassed within lid removal facilitation means in accordance with the invention. For example it is possible in one embodiment, to form each tab 50, 54 as a lift up tab which is part of the lid and has a weakened living hinge so that a person can essentially peel the lid open by grasping and pulling the tab (see FIGS. 2, 4 and 5).

An important feature of the vessel is to enable suction to be provided on both sides. To this end, the lower rim 14 is provided with a flat lower edge 60 around its perimeter that is configured to provide effective suction when the vessel 10 is pressed, in the orientation shown in FIG. 1, downward against a horizontal surface with which suction can develop. Similarly, the upper rim 32 is provided with a flat upper edge 62 around its perimeter that is configured to provide effective suction when the vessel 10 is pressed, in an opposite orientation to that shown in FIG. 1, downward against a horizontal surface with which suction can develop.

As an example, the lower and upper edges 60, 62 may be constructed as a 360° piano flat that forms a seal for suction when pressed against a flat surface against which a suction force can be formed (see FIGS. 2 and 3). This type of seal is particularly effective when a liquid, e.g., water is applied to the lower and upper edges 60, 62.

In a general sense, the rims 14, 32 are provided with suction-providing means that may take the form of a particular construction of the edges of the rims 14, 32.

To avoid interfering with the suction capability of the lower and upper rims 14, 32, it is important to recess the lids 44, 46 away from the suction-providing means of the respective lower and upper rims 14, 32. That is, as shown in FIGS. 2 and 3, the lid 44 when engaged with the base 12, does not have any portion that is in a plane defined by the lower, suction-providing edge 60 of the lower rim 14. Similarly, the lid 46 when engaged with the base 12, does not have any portion that is in a plane defined by the upper, suction-providing edge 62 of the upper rim 32.

In use, each lid 44, 46 would be pressed into the vessel 10 below the respective bead 48, 52 until it rests on the respective lid-receiving portion and on the respective rib(s) 38 or shelf or ridge 56, 58. The lids 44, 46 are identical so each can be used for sealing the lower or upper chamber space 40, 42. Pressing of lid 44 is effective to cause the lid 44 to be trapped on the lid-receiving portion between the ribs 38 around the lower chamber space 40 and the annular bump or bead 48. Similarly, pressing of lid 46 is effective to cause it to be trapped on the lid-receiving portion between the ribs 38 around the upper chamber space 42 and the bead 52.

The presence and use of both lids 44, 46 is not essential to the invention and the vessel 10 may be used without one or both lids 44, 46. However, for use as a storage unit, both lids 44, 46 would be provided to enable storage of material in both the lower and upper chamber spaces 40, 42. Obviously, removal of one lid 44, 46 enables the respective chamber space to be accessed for a variety of different purposes, including, storing items therein, retrieving items stored therefrom, packaging items into the chamber space, and placing items to be served into the chamber space.

Vessel 10, including the vessel base 12 and lids 44, 46 can be manufactured to be one-time use (i.e., with thin walls and from cheap plastic) or re-usable as in the case of Tupperware® or Gladware® or Rubbermaid® and the like. Vessel 10 can be upper-rack dishwasher safe as well as microwave safe. This is a choice of application and choice of thermoplastic substrate. One time use can be designed for sale in a retail supermarket package or Home Depot hardware package filled with product (food, hardware, etc.) The advantage over conventional blister packs is these perform suction as well as carry product. If produced very cheaply with a thin wall, it might have limited secondary use. If, on the other hand, the vessel 10 is made more sturdily, it can have practical after use. Reusable packaging has great advantages insofar as there is a further incentive to buy the contents. As such, it can be marketed as a package with product, or sold individually as a container, etc.

Vessel 10 is also designed to enable multiple compartments to be formed in each of the upper and lower chamber spaces 40, 42. To this end, a container support structure or means is provided for each of the chamber spaces 40, 42. As an example of such means, the projecting rims 34, 36 are formed, one on each side of the intermediate wall 24 (see FIG. 3). Each rim 34, 36 is designed to engage with a lower rim 64, 66 of a respective container 68, 70, with the lower rim 64, 66 being retained inward of the respective rim 34, 36 (see FIGS. 2 and 4). As such, containers 68, 70 do not move once placed into engagement with the intermediate wall 24 and sandwiched between the intermediate wall 24 and the lids 44, 46.

Each container 68, 70 also includes a lower wall 72 and an annular wall 74.

To improve retention of containers 68, 70, the inner sides of the lids 44, 46 are also provided with projecting rims 76, 78 which are designed to be positioned inward or outward (not shown) of the upper edges of annular walls 74 (see FIG. 2). As shown in FIGS. 1-3, the containers 68, 70 have a generally cylindrical shape with the lower rims 64, 66 and annular wall 74 having a circular shape. However, other shapes of rims and containers are envisioned. In addition, other cooperating retaining structure or means for retaining the containers 68, 70 in engagement with both the base 12 and the lids 44, 46 are envisioned and encompassed within the scope of the invention, Such container retaining means may have any form known to those skilled in the art.

Moreover, the presence of containers 68, 70 on the base 12 assist in the maintenance of suction by the vessel 10 by transference.

Each of containers 68, 70 is selectively engaged with the base 12, depending on, for example, the number of separate items the users wants to store in the vessel 10. If only two items, the user does not require any containers 68, 70 and can store one item in chamber space 40, close the chamber space 40 using lid 44, place the other into chamber space 42 and then close the chamber space 42 using lid 46. If three items, the user places container 68 into engagement with the base 12, and then fills container 68, the space around container 68 in the upper chamber space 40, closes chamber space 40 using lid 44, then places items into the lower chamber space 42 and closes chamber space 42 using lid 46. If four items, the user places containers 68 into engagement with the base 12, and then fills container 68, the space around container 68 in the upper chamber space 40, closes chamber space 40 using lid 44, then places container 70 into engagement with the base 12, fills container 70 and the space around container 70 in the lower chamber space 42, and then closes chamber space 42 using lid 46.

FIG. 4 shows an exploded view of the vessel 10 and the engagement of the various parts. Containers 68, 70 and are located on either side of the base 12, and then the lids 44, 46 are engaged with the base 12 to sandwich the containers 68, 70 between the intermediate wall 24 of the base 12 and the lids 44, 46, respectively, 36 and 76 trap 70. 76 seals in the contents of container 70. This prevents spill-over of the contents.

Figure 5:
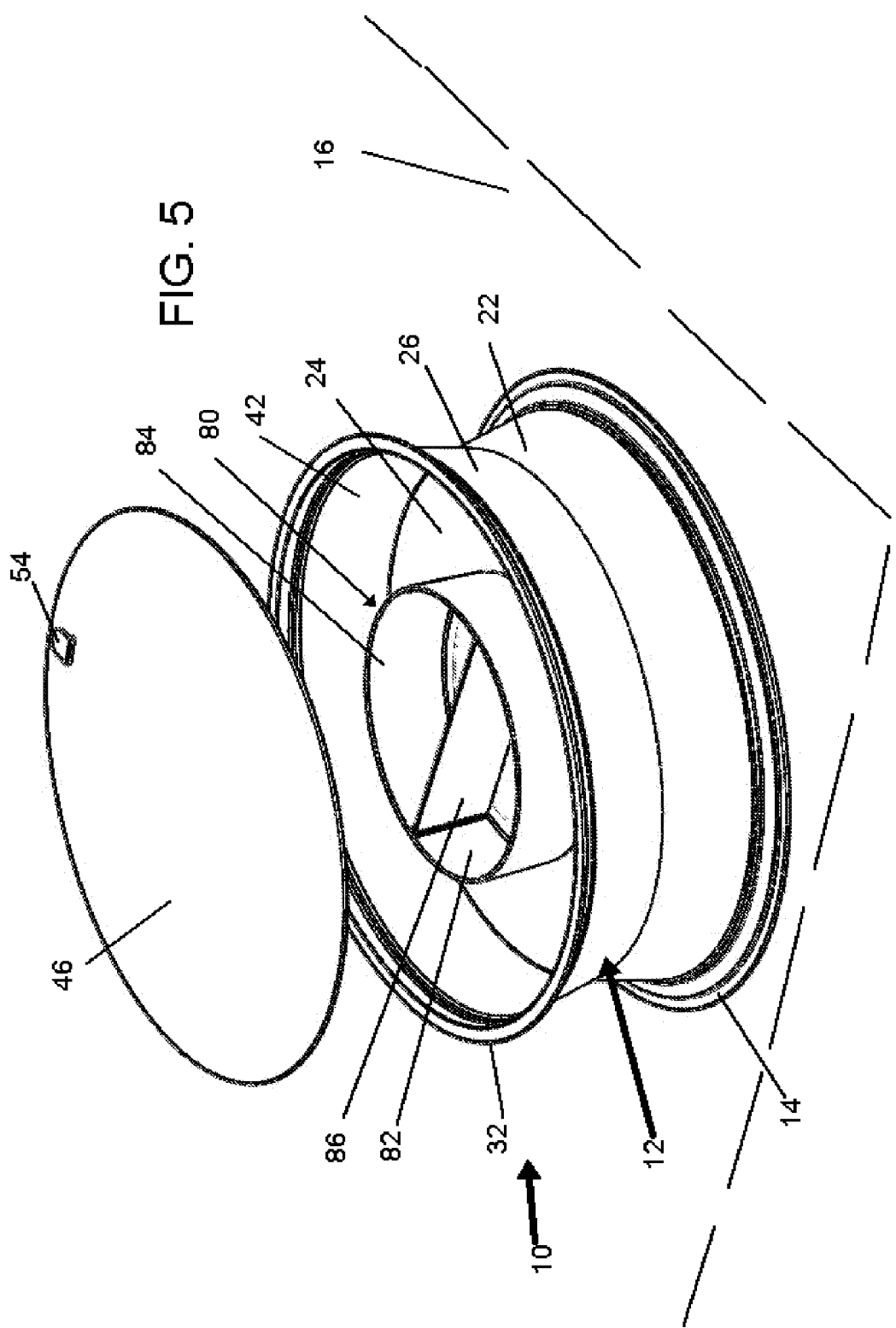
FIG. 5 is a perspective view of the vessel shown in FIG. 1 with an alternative interior removable vessel.

FIG. 5 shows an alternative to containers 68 and 70, namely a container 80 that itself defines two separate compartments 82, 84. A partition wall 86 between compartments 82, 84 is formed to avoid interfering with the rims 76, 78 on the inner sides of the lids 44, 46, respectively. For example, the height of the partition wall 86 may be slightly less than the height of the annular wall 74 (In FIG) of the container 80. If it's liquid, it may be more ideal if the same height so it engages with the lid to form more of a seal. It is possible for the raised rib on the lid to be two "D" shapes to fit into the two separate compartments and thus seal in the contents. Or it can be one round raised rib to go over the container to seal in the contents. Both function essentially the same.

A vessel in accordance with the invention may be sold as a kit with base 12, one or more of containers 68, 70 and one or more of containers 80. Thus, the kit may include one container 68 and one container 80, or two containers 80, or containers 68 and 70. Any number of containers 68, 70 and containers 80 may be provided. Also, it is possible to form another insertable container with three separated compartments, or four, or any number of separate compartments in the same manner as container 80 is formed, e.g., using one or more partition walls.

It is also possible to construct the container support means to support two containers in the same chamber space 40, 42. In this case, two half-round containers may be formed, and can be used together or independently by engaging with the rims on the intermediate wall 24 and the lids 44, 46.

Instead of having one or more removable containers 68, 70, 80, it is possible for the base 12 to be formed with an integral partition in one or both of the upper and lower chamber spaces 40, 42. Such an integral partition may be circular and enables two different foods or objects to be placed in the upper and/or lower chamber space 40, 42. The lid 44, 46 would form a snug fit over the chamber space 40, 42, respectively, so that when in place, the lid 44, 46 prevents the food in one compartment from mixing with the food in the other compartment.

Figure 6:
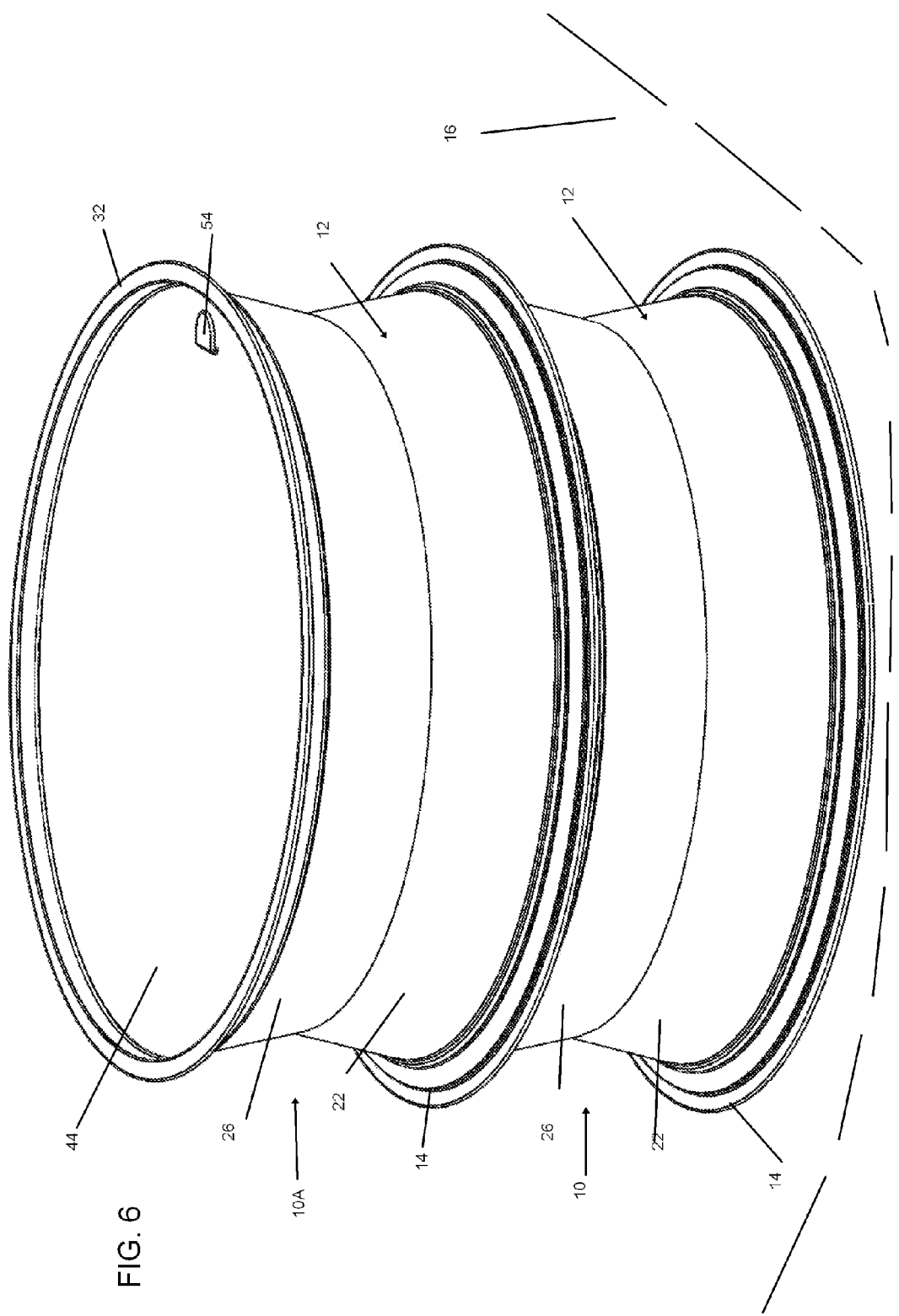
FIG. 6 is a perspective view of two of the vessels shown in FIG. 1 stacked and engaged with one another.
Figure 7:
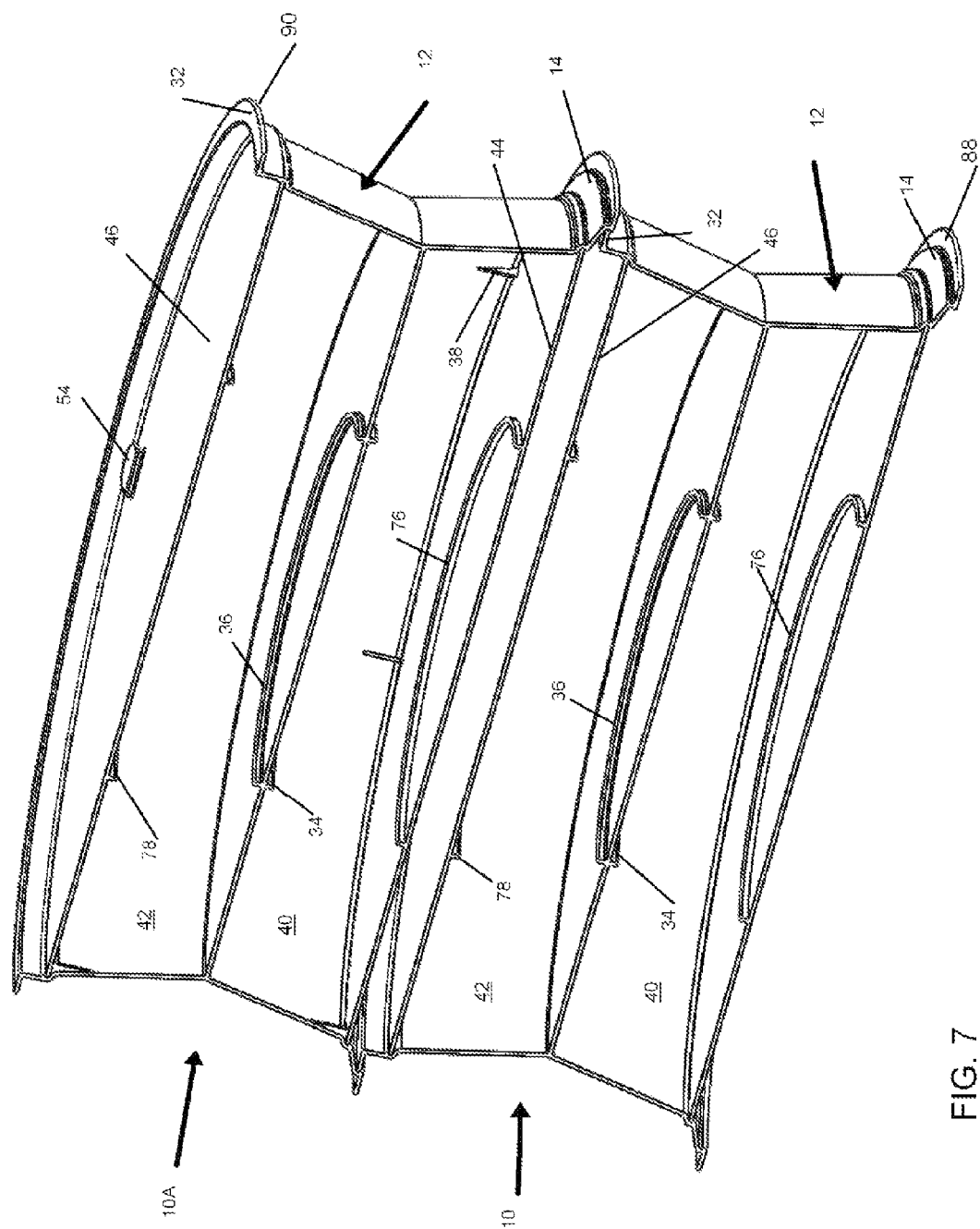
FIG. 7 is a cross-sectional view of the stack of vessels shown in FIG. 6 without any interior vessels.

Another important feature is the stackability of the vessel 10 (see FIGS. 6 and 7). To facilitate stackability, the lower rim 14 is provided with an inner peripheral surface 88 that is the same as or only slightly larger than the outer peripheral surface 90 of the upper rim 32 (see FIG. 2). This enables a second vessel 10A to be stacked on top of vessel 10 (vessel 10A having the same or a similar construction as vessel 10). Even further, yet another vessel 10 may be stacked on top of vessel 10A, and so on. In this manner, a stack of a plurality of vessels 10 may be formed. Such a stack would be particularly useful for storing various objects, such as different toppings for pizza or ice cream in a restaurant. Formation of such a stack would also be helpful for packaging and transportation purposes. Moreover, by storing objects in vertically stacked vessels, less horizontal shelf space is needed for storage of those objects since two, three, four or more vessels may be stacked in a single stack and occupy the horizontal space of a single vessel. This provides a significant advantage as opposed to a situation where two, three, four or more vessels must each be placed on and in contact with the same horizontal shelf. Also, the suction between adjacent vertically stacked vessels will likely contribute to the vertical stability of the stack.

In a more general sense, the lower and upper rims 14, 32 are provided with cooperating mating structure. That is, when the lower rim 14 is provided with or configured as male mating structure, the upper rim 32 is provided with or configured as a female mating structure. The male and female mating structures are configured to provide an interference fit or a snap-fit to one another to provide for a secure attachment of one vessel 10 to another when a stack of vessel is formed. Nevertheless, although providing a male mating structure on one side of the vessel 10 and a female mating structure on the other side of the vessel 10 is a preferred embodiment, it is contemplated that one vessel may be provided with two male mating structures or a vessel may be provided with two female mating structures. The different types of vessels may include or be integrated with indicia indicative of the type of mating structures thereon.

Vessel 10 may be manufactured by molding as a one-piece part using currently known injection-molding machines. Such machines can mold the vessel 10 in various colors and sizes. The least costly approach would be to mold the vessel 10 in a single color and size. A transparent color may be preferred in embodiments wherein a water seal is used.

In an alternative manufacturing technique, the vessel may be constructed from two parts. The embodiment shown in FIGS. 8-14 is an example of a vessel 100 including a vessel base 102 made from two parts 104, 106. The two vessel parts 104, 106 may be separately manufactured and can be attached to one another for use.

Figure 8:
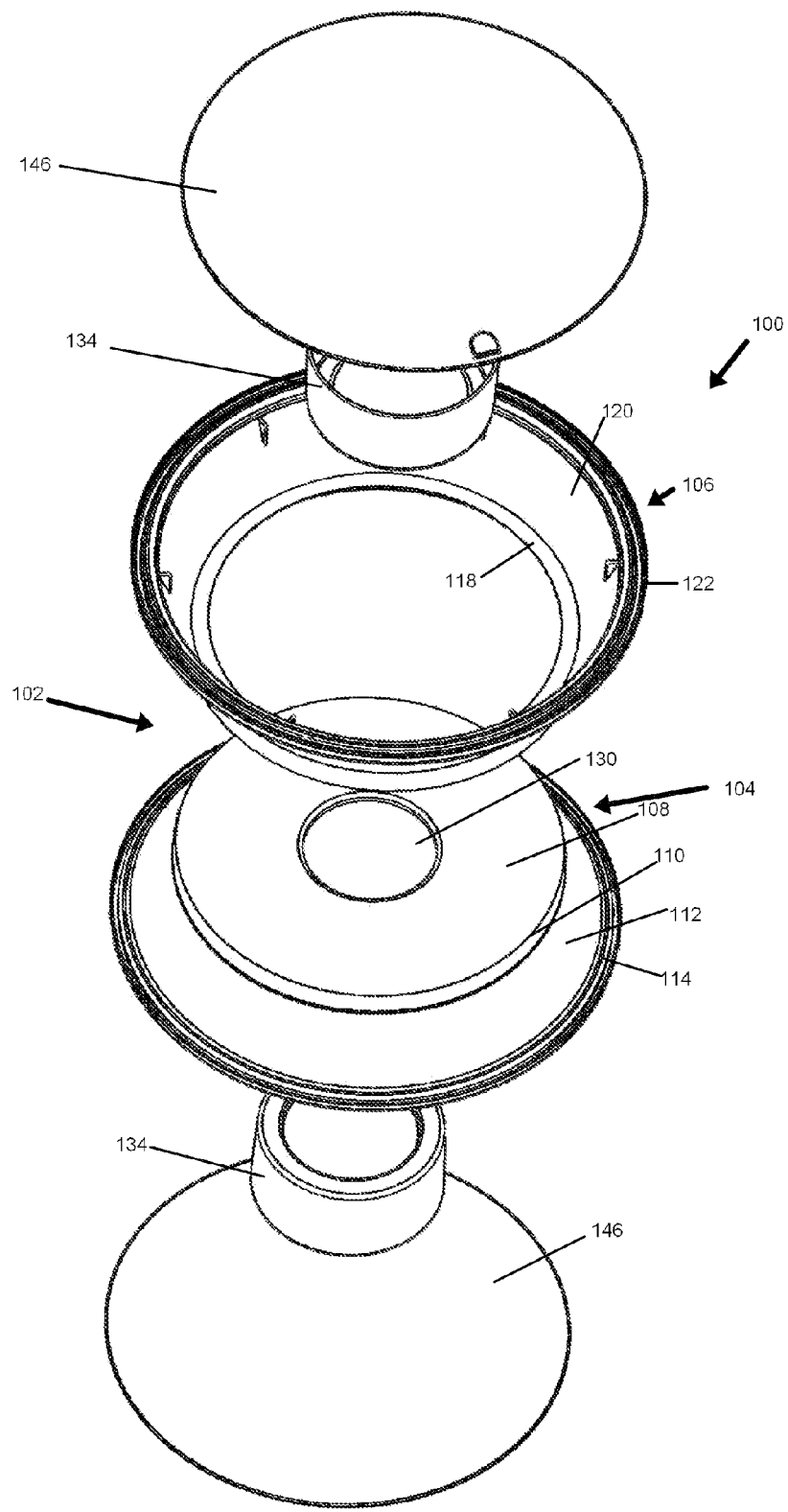
FIG. 8 is an exploded, perspective view of a second embodiment of a vessel in accordance with the invention.
Figure 9:
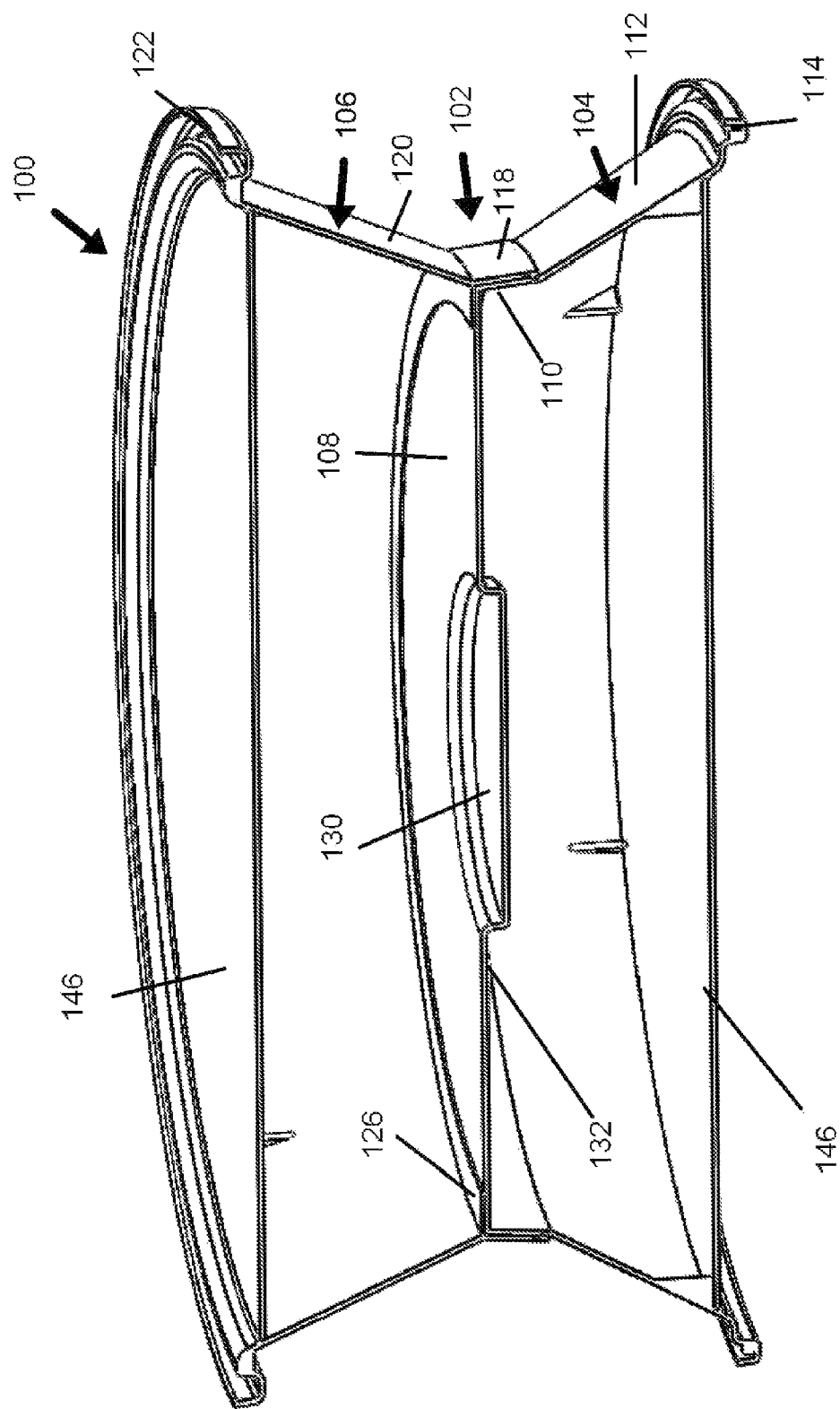
FIG. 9 is a cross-sectional view of the vessel shown in FIG. 8 with the lids removed.
Figure 10:
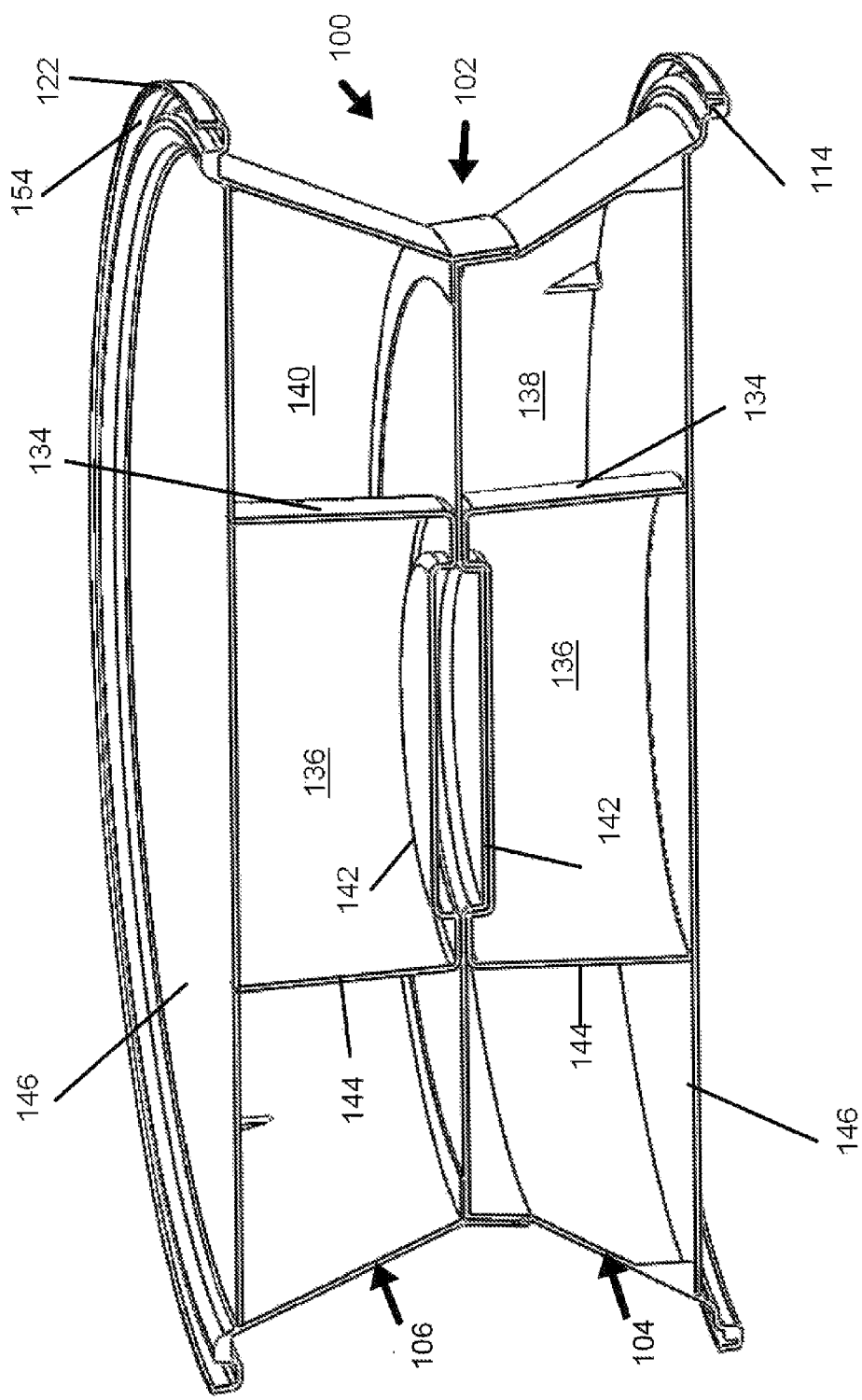
FIG. 10 is a cross-sectional view of the vessel shown in FIG. 8 with the lids engaged, with interior containers therein and without items stored therein.

A first vessel part 104 shown in FIG. 8 is a "full" vessel including an intermediate wall 108, an annular wall 110 extending upward from the outer edge of the intermediate wall 108, an outwardly tapering side wall portion 112 extending from the upper edge of the annular wall 110 and a seal rim 114 at the upper edge of the tapering wall 112 (see FIGS. 9 and 10). Vessel part 104 may be molded in one-piece with a thin wall thickness from polypropylene. At least a portion of the seal rim 114 is molded to enable a suction seal to be provided thereby when pressed against a flat surface. Seal rim 114 also has a generally U-shaped cross-section to enable mating with a complementary portion of the second vessel part 106 (described below). The vessel part 104 is also provided with a circumferential groove 116 in the outer surface of the annular wall 110 (see FIG. 11).

Vessel part 104 may also be provided with the same lid-supporting means and lid-engaging means as described above.

Vessel part 106 is an open hollow vessel part that defines an annular wall 118 of larger cross-section than annular wall 110, an outwardly tapering side wall portion 120 extending from a lower edge of the annular wall 118, and a seal rim 122 at the lower edge of the tapering wall portion 120 (see FIGS. 9 and 10). The vessel part 106 is also provided with a circumferential bead 124 in the inner surface of the annular wall 118 that fits into the circumferential groove 116 in the annular wall 110 of the vessel part 104 to thereby enable mating of vessel parts 104, 106 together (see FIG. 11).

Vessel part 106 also includes a seat 126 that projects radially inward from an area around a juncture of the annular wall 118 and wall portion 120, either on the annular wall 118 on the wall portion 120 or partly on both. Seat 126 thus has an annular form. Seat 126 optionally has a soft durometer overmolded or snap-in gasket thereon (not shown) to ensure an air-tight and water-tight first when vessel parts 104, 106 are attached together. This gasket may be made from a rubberized thermoplastic material. Vessel 106 does not require the gasket and may function comparably without the gasket. A snap seal type of attachment of vessel parts 104, 106 may perform an equivalent function as the gasket.

At least a portion of the seal rim 122 is molded to enable a suction seal to be provided thereby when pressed against a flat surface. This portion may be the flat area more proximate to the center of the vessel base 102, with a remaining portion of the seal rim 122 having a U-shaped channel 154.

Vessel parts 104, 106 may be manufactured such that the wall portions 112, 120 defined thereby have substantially the same heights (as shown). Although they may also be manufactured to provide different heights and thus two different height chambers defined by the base 102.

Figure 11:
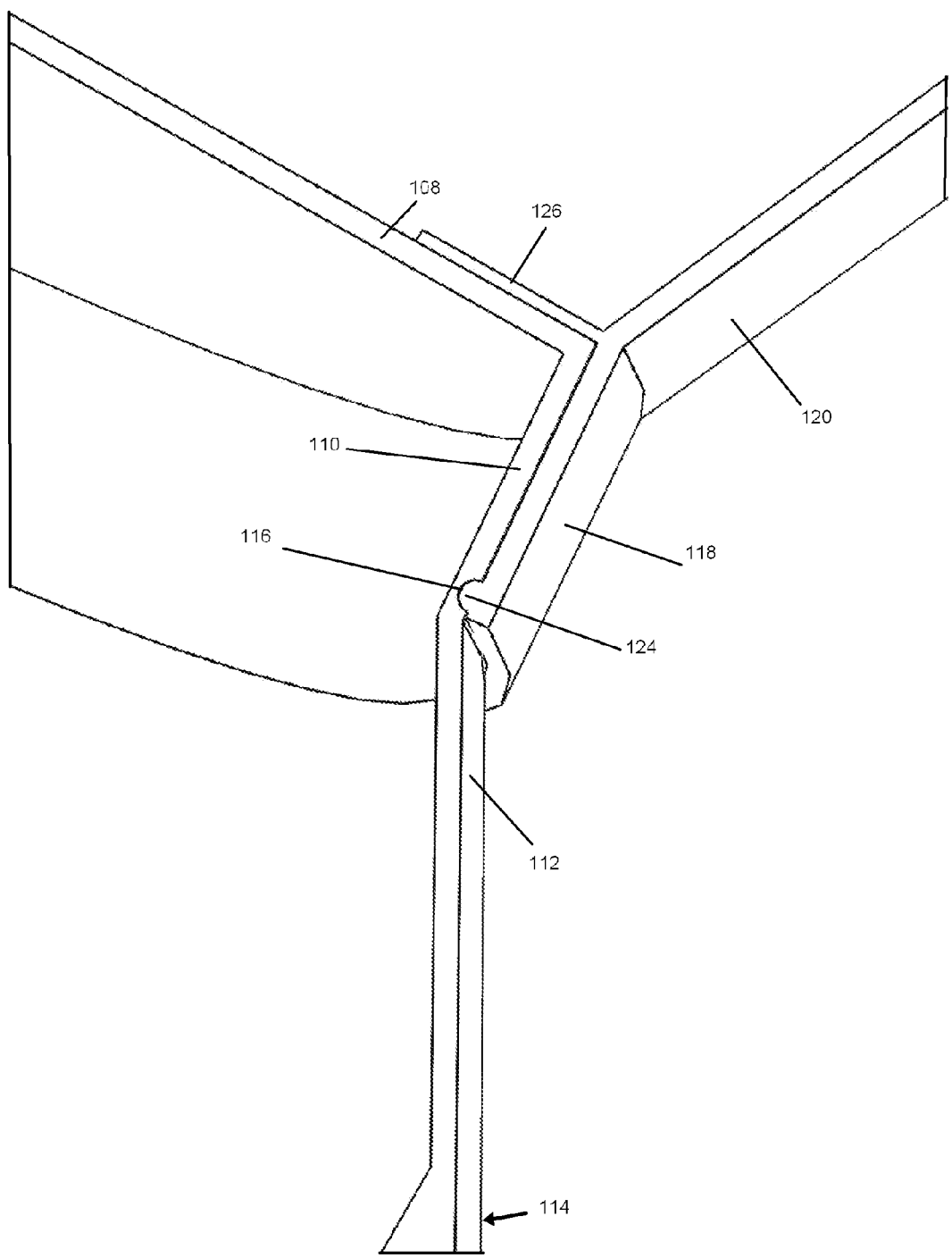
FIG. 11 is an exploded view of the mating structure of two vessel parts of the vessel shown in FIG. 8.

Assembly of the vessel base 102 entails bringing vessel parts 104 and 106 together so that the intermediate wall 108 is against the annular wall 126, while causing the bead 124 to fit into the circumferential groove 116 (see FIG. 11). In this manner, a secure attachment of the vessel parts 104, 106 to one another is provided. Instead of the cooperating circumferential groove 116 and bead 124, other attachment structure or means may be provided, and such attachment structure known to those skilled in the art is encompassed within the scope of the invention. Such attachment structure would include one part on the vessel part 104 and another part on the vessel part 106 that cooperate to prevent unforced separation of the vessel parts 104, 106 from one another.

Advantages of the formation of vessel 100 from vessel parts 104, 106 are that the vessel 100 is easier to clean because the vessel parts 104, 106 can be separate and then cleaned separately and re-assembled after cleaning. Further, the molding process is likely to be simpler when molding vessel parts 104, 106 than when molding a single piece. Among other things, there are fewer undercuts and simpler parting lines which ease the molding process. Both vessel parts 104, 106 may be formed from thin wall polypropylene, and preferably sufficiently resilient to provide the suction capability at their upper and lower edges, respectively. Another advantage is both part 104 and 106 can be molded in different colors for decorative mix-and-match purposes. One can be transparent and one can be solid, for example.

From the perspective of the vessel part 104 when seal rim 114 is oriented upward, intermediate wall 108 includes an optional raised area 130 surrounded by a sunken area 132 to allow for registration with a partitioning wall or vessel 134 that defines another storage compartment 136 (see FIG. 10). A raised area may be formed on the upper side of the intermediate wall 108 and/or on the lower side of the intermediate wall 108. When a raised area is formed on both sides, and two mating vessels 134 are provided, there will be a total of four compartments, two defined in a lower chamber space 138 and two defined in the upper chamber space 140 of the vessel 100.

As shown in FIG. 10, the vessel 134 has a lower wall 142 that conforms generally to the shape of the raised area 130 and a part of the surrounding sunken area 132, and an annular wall 144. The height of the annular wall 144 is slightly less than the height of the chamber spaces 138, 140 to avoid interference with the lids 146. An advantage for the vessel 100 is the ability to use vessel part 104 alone as a simple storage container from time-to-time. This has a practical advantage over the unibody embodiment shown FIGS. 1-7. Another advantage to the two-part vessel 100 is storage. Without the lids and inner containers, a plurality of vessel parts 104 can nest on each other. Likewise, a plurality of vessel parts 106 can in a similar fashion do the same. To nest, a certain amount of draft is required. If the inner containers have sufficient draft, they can nest on one another as well. Finally the lids 146 can be stacked on top of one another.

In a more general sense, the vessel 100 includes interior container support structure or means that support an interior vessel or container to thereby partition the chamber space defined on each side of the intermediate wall 108 when the vessel parts 104, 106 are together. These means are not limited to the raised area 130 and surrounding sunken area 132 and other support means known to those skilled in the art are encompassed within the scope of the invention.

Figure 12:
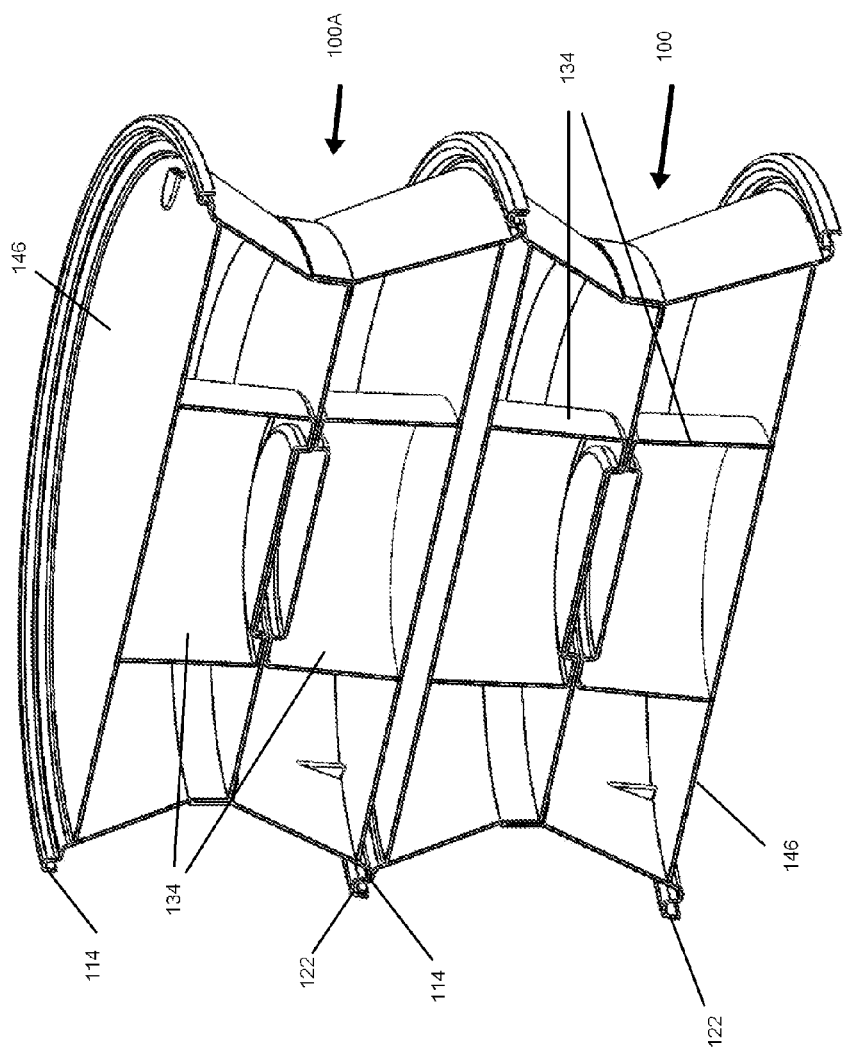
FIG. 12 is a cross-sectional view of a stack of two vessels shown in FIG. 8.

As shown in FIG. 12, vessel 100 may be stacked by engaging the seal rim 114 or one vessel to the seal rim 122 of another vessel 100A, or more specifically, inserting the U-shaped seal rim 114 into the U-shaped channel portion of seal rim 122. Thus, each seal rim 114, 122 serves the dual functions of enabling suction to be provided when pressed against a surface against which suction can be generated, and to enable stackability of multiple vessels 100 together.

Figure 13:
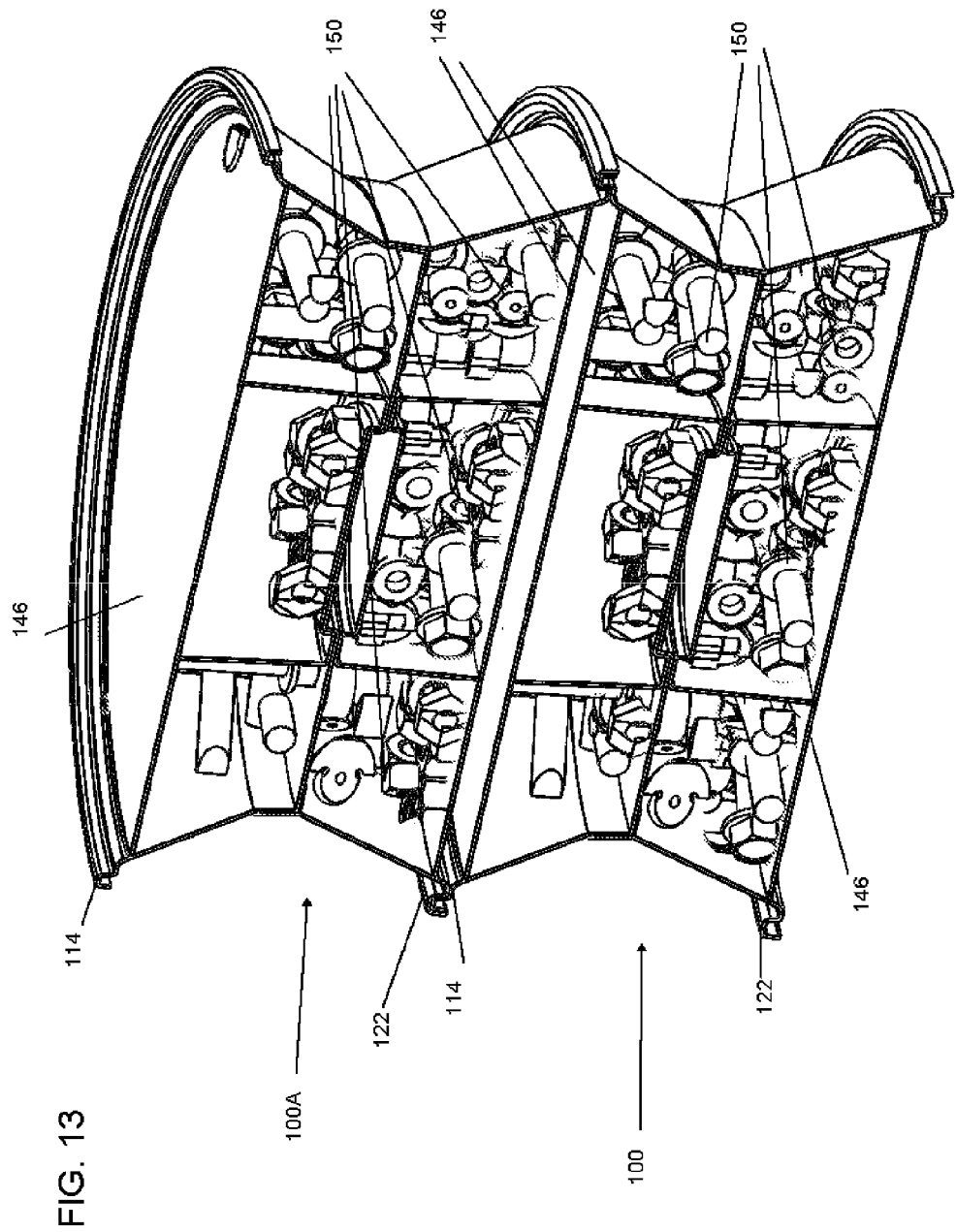
FIG. 13 is another cross-sectional view of a stack of two vessels shown in FIG. 8 with interior vessels and an assortment of hardware stored in all of the compartments defined by the vessels.

FIG. 13 is another cross-sectional view of two of the vessels 100 shown in FIG. 8, the upper one now designated 100A, which are stacked one on top of the other. Vessels 100, 100A each include optional interior vessels 134 and an assortment of hardware products 150, such as bolts, screws, nuts, stored in all of the compartments defined by the vessels 100, 100A.

Figure 14:
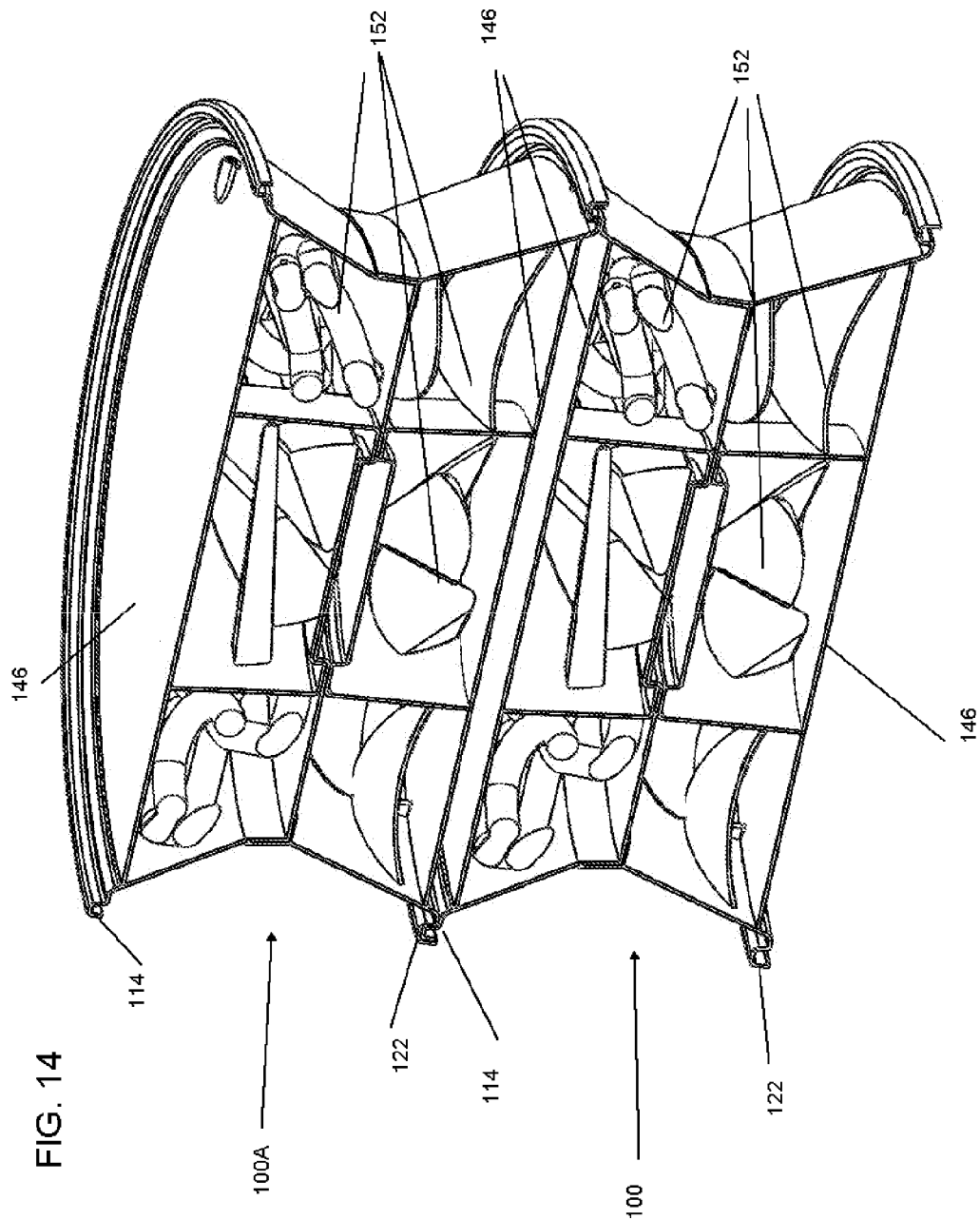
FIG. 14 is another cross-sectional view of a stack of two vessels shown in FIG. 8 with interior vessels and an assortment of food stored in all of the compartments defined by the vessels.

FIG. 14 is another cross-sectional view of two of the vessels shown in FIG. 8, designated 100, 100A, with optional interior vessels 134 and an assortment of food 152 stored in all of the compartments defined by the vessels 100, 100A.

Vessel 100 may have any desired shape. A preferred shape is circular or round because the suction providing effect is best when circular lower and upper seal rims 114, 122 are present. One reason might be because the pressing force to obtain the suction spreads out proportionally for a circular vessel 100, but would not likely for a square, rectangular, or hexagonal vessel. Nevertheless, although a circular vessel is likely optimal, the invention is not limited to a circular vessel and encompasses other shapes of vessels.

There are numerous uses for the vessels 10, 100. As an example, it is possible to carry two different meals or two different snacks when travelling, one in each of the lower and upper chamber spaces. The meals might be for the same person at two different times, or for two different people at the same time, with one eating after the other since only one chamber space is available when the vessel 10, 100 is horizontally oriented.

Vessel 10, 100 is ideal for parents to use for feeding babies, toddlers and children. It is also good for feeding pets, with the vessel 10 containing water in one chamber space and feed in other chamber space. It can also be used for hospitals and other places for feeding sick, injured or handicapped people, since it can be temporarily adhered to a table, tray table or other horizontal surface. Other applications involve retail food packaging, hardware packaging (see FIGS. 13 and 14).

Referring now to FIGS. 15-17, another embodiment of a vessel in accordance with the invention is designated generally as 160 and includes a unitary vessel base 162 that includes an intermediate wall 164, a lower side wall 166, and an upper side wall 168. Intermediate wall 164 and lower side wall 166 define a lower chamber space 170, while intermediate wall 164 and upper side wall 168 define an upper chamber space 172. A seal rim 174 is situated at the lower edge of the lower side wall 166 and a seal rim 176 is situated at the upper edge of the upper side wall 168. Seal rims 174, 176 enable one vessel 160 to be stacked to another similar vessel while also provided suction. Thus, seal rims 174, 176 may have any of the forms described above.

As shown, the upper seal rim 176 has an outer peripheral surface 180 that is equal to or slightly smaller than an inner peripheral surface 178 of the lower seal rim 174 so that outer seal rim 176 can fit within the lower seal rim 174 when two vessels 160 are mated to one another (see FIG. 17). Lids (not shown) may engage with lid-receiving portions defined on the inner surfaces of the side walls 166, 168 to retain lids.

FIG. 17 shows only the upper part of a lowermost one of the vessels 160 in a potential stack of vessels 160 that is designed to mate with the lower part of an adjacent, uppermost one of the vessels in the same stack. The remaining portions of the vessels 160 in FIG. 17 are not shown.

The embodiment shown in FIGS. 15-17 thus represents the general concept of a multi-compartment vessel having a common intermediate, preferably flexible wall, with suction chambers on both sides and sealing surfaces of the rims of side walls defining the two suction chambers. The variations described above in the vessels 10, 100 may also be used for vessel 160.

The present application therefore encompasses a utensil, container, package, vessel or other term for an item capable of containing, retaining, storing, holding items. The vessel includes a base that defines a plurality of compartments and by providing suction-generating means on both sides, is capable of being attached by suction to a horizontal surface in two orientations. These suction-generating means may be integrated into the rims of the vessel base. In one orientation, at least one chamber would be usable when a lid or cover thereof is removed, and in the other orientation, at least one other chamber would be usable when a lid or cover thereof is removed. Thus, depending on which chamber or contents therein are sought to be used, the vessel would be oriented and attached by suction to the horizontal surface, As an example of use, a parent may give the vessel to their child for lunch and put pasta in one compartment and cut vegetables in the other. When the child wants to eat the pasta, they would orient the vessel such that the pasta-containing compartment faces upward, place the vessel on a horizontal surface and optionally press it against the surface to form a suction-seal and then remove the lid and eat the pasta. When the pasta is finished, or the child wants vegetables, they would close the pasta compartment with the lid, inverted the device such that the vegetable-containing compartment faces upward, place the vessel on a horizontal surface and optionally press it against the surface to form a suction-seal and then remove the lid and eat the vegetables.

To increase the number of different items that can be placed into the base, the base may be provided with connecting means for releasably or permanently connecting one or more sub-vessels thereto. These sub-vessels may be small cylindrical containers that include structure on their lower and/or upper surface that engages with complementary or mating structure on an intermediate wall of the base and/or the lids to secure the containers in position between the intermediate wall of the base and the lids when the lids are in place. As such, the contents in the space between the container and the peripheral wall of the base are not smushed. With such sub-vessels, a salad dressing for example, may be placed into the sub-vessel and surrounded by a compartment full of cut vegetables.

A further advantage of the vessels in accordance with the invention is their stackability which allows for easy storage of the vessels, when either full or empty. The same structure that enables the stackability may also constitute all or part of the suction-generating means.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A vessel, comprising:
 a vessel base comprising:
  an intermediate wall portion, an upper wall portion on one side of said intermediate wall portion, a lower wall portion on an opposite side of said intermediate wall portion, a lower rim adjacent said lower wall portion and an upper rim adjacent said upper wall portion,
  said upper wall portion and said intermediate wall portion defining an upper chamber space including at least one upper chamber,
  said lower wall portion and said intermediate wall portion defining a lower chamber space including at least one lower chamber, and
  said upper and lower rims being configured to provide suction when pressed against a flat surface;
 an upper lid that engages with an upper lid-receiving portion defined by said vessel base to selectively close said upper chamber space; and
 a lower lid that engages with a lower lid-receiving portion defined by said vessel base to selectively close said lower chamber space.

2. The vessel of claim 1, wherein said base has a unitary structure.

3. The vessel of claim 1, wherein said base includes lid-engaging means for removably trapping said lids onto said base.

4. The vessel of claim 3, wherein said lid-engaging means comprise circumferential beads.

5. The vessel of claim 1, wherein said base includes lid-supporting means for supporting said lids in engagement with said base.

6. The vessel of claim 1, further comprising container support means for supporting at least one interior container in each of said upper and lower chamber spaces.

7. The vessel of claim 6, wherein said container support means comprise a rim formed on said intermediate wall and extending into each of said upper and lower chamber spaces.

8. The vessel of claim 7, further comprising interior containers, each including a lower rim configured to abut against an inner surface of one of said rims formed on said intermediate wall.

9. The vessel of claim 8, wherein each of said containers further includes an annular wall and said lids each include a rim on an underside that engages with said interior container to thereby secure said interior containers in connection with said base.

10. The vessel of claim 8, wherein at least one of said interior containers defines a pair of compartments.

11. The vessel of claim 1, wherein said upper rim is configured to have a complementary structure to said lower rim to enable stackability of the vessel via engagement of a lower rim of one vessel to an upper rim of another vessel.

12. The vessel of claim 1, wherein said base includes a first vessel part and a second vessel part that is selectively separable from said first vessel part.

13. The vessel of claim 12, wherein said first vessel part defines said intermediate wall portion, said upper wall portion and said upper rim, and said second vessel part defines said lower wall portion and said lower rim.

14. The vessel of claim 13, further comprising cooperating mating structure to selectively attach said first and second vessels together.

15. The vessel of claim 14, wherein said mating structure includes an annular seat and an annular rim on said second vessel part, said first vessel part having a mating portion configured to fit with a tight interference inside said annular rim and on said annular seat.

16. The vessel of claim 15, wherein said mating portion of said first vessel part includes an annular wall having one of a circumferential groove or bead and said annular wall of said second vessel part having the other of said circumferential groove or bead.

17. The vessel of claim 13, wherein said intermediate wall portion includes at least one raised area surrounding by a sunken area.

18. The vessel of claim 17, further comprising at least one interior container configured to be seated on said raised area.

19. A vessel, comprising:
 two lids; and
 a vessel base comprising:
  compartment forming means for forming two independent, unconnected compartments opening on upper and lower sides of said base;
  suction-providing means arranged at upper and lower edges of said compartment forming means to enable said base to be suction-attached to a surface;
  cooperating mating means arranged at said upper and lower edges of said compartment forming means to enable the vessel to be stacked onto another vessel; and
  lid-engaging means for releasably securing said lids in connection with said base.

20. The vessel of claim 19, further comprising interior compartment defining means arranged on at least one of said compartment forming means and said lids for partitioning one of said two compartments into a plurality of independent sub-compartments.

* * * * *